United States Patent
Chuang et al.

(10) Patent No.: US 6,682,653 B2
(45) Date of Patent: Jan. 27, 2004

(54) FLOATED BIOLOGICAL TREATMENT APPARATUS AND PROCESS FOR PURIFYING REFRACTORY WASTEWATER OR RAW WATER

(75) Inventors: Shun-Hsing Chuang, Hsinchu (TW); Chung-Fan Chiou, Hsinchu (TW); Huey-Song You, Hsinchu (TW); Wang-Kuan Chang, Keelung (TW); Hsin Shao, Hsinchu (TW); Mine-Jine Peng, Hsinchu (TW); Ren-Yang Horng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 56 days.

(21) Appl. No.: 10/000,322

(22) Filed: Dec. 4, 2001

(65) Prior Publication Data
US 2003/0080054 A1 May 1, 2003

(30) Foreign Application Priority Data
Oct. 30, 2001 (TW) .......................... 90126919 A

(51) Int. Cl.[7] ................................. C02F 3/00
(52) U.S. Cl. ..................... 210/616; 210/150; 210/151; 210/617
(58) Field of Search ................ 210/150, 151, 210/615, 616, 617, 618, 620

(56) References Cited

U.S. PATENT DOCUMENTS

| | | | | |
|---|---|---|---|---|
| 4,664,803 A | * | 5/1987 | Fuchs et al. ............... | 210/617 |
| 4,696,747 A | * | 9/1987 | Verstraete et al. .......... | 210/150 |
| 5,202,027 A | * | 4/1993 | Stuth .......................... | 210/151 |
| 5,227,051 A | * | 7/1993 | Oshima ...................... | 210/151 |
| 5,232,586 A | * | 8/1993 | Malone ...................... | 210/151 |
| 5,308,479 A | * | 5/1994 | Iwai et al. .................. | 210/151 |
| 5,543,052 A | * | 8/1996 | Lupton et al. .............. | 210/150 |
| 5,558,763 A | * | 9/1996 | Funakoshi et al. .......... | 210/150 |
| 5,750,041 A | * | 5/1998 | Hirane ........................ | 210/617 |
| 5,833,857 A | * | 11/1998 | Roth ........................... | 210/617 |
| 6,110,389 A | * | 8/2000 | Horowitz ..................... | 210/150 |

OTHER PUBLICATIONS

Steel & McGhee "Water Supply and Sewarage" p. 428, 1979.*

* cited by examiner

Primary Examiner—Christopher Upton
(74) Attorney, Agent, or Firm—Sughrue Mion, PLLC

(57) ABSTRACT

The present invention provides a floated biological treatment apparatus and a process for purifying refractory wastewater or raw water for drinking water. The treatment apparatus of the present invention includes a supporting plate for dividing the treatment apparatus into upper and lower portions. The upper portion is formed into a reactor, and porous compressible carriers are filled with the reactor in an amount of 80 vol % to 100 vol % of the reactor volume. The lower portion is provided with a liquid inlet for introducing the refractory wastewater or raw water and a gas inlet. The reactor is provided with at least one top carrier blocking plate at the top, such that the carriers can be limited by the top carrier blocking plate to be retained in the reactor, and the carriers can become a floating state. By means of the process or apparatus of the present invention, the cost for treating refractory organic material can be reduced, the treatment efficiency can be enhanced, and the quality of the effluent can be improved. In addition, since the carriers are in a floating state, they will have the advantages of low abrasion. The clogging problems can be prevented, and the gas and the influent can be evenly distributed.

13 Claims, 1 Drawing Sheet

US 6,682,653 B2

FLOATED BIOLOGICAL TREATMENT APPARATUS AND PROCESS FOR PURIFYING REFRACTORY WASTEWATER OR RAW WATER

BACKGROUND OF THE INVENTION

1. Field of the Invention

The present invention relates to a water treatment apparatus and process, and more particularly to a floated biological treatment apparatus and a process for purifying refractory wastewater and raw water.

2. Description of the Prior Art

Treating wastewater in a biological manner can be classified into two categories: fixed bed operation and fluidized bed operation. The fixed bed operation suffers from clogging in the reactor, which severely affects treatment efficiency. The fluidized bed operation suffers from severe abrasion of carriers because of vigorous stirring of the carriers. This causes biofilms on the carrier surfaces unstable, which in turn affects the treated water quality.

Refractory wastewater, such as secondary treated water, contains refractory organic material that cannot be removed by the conventional secondary biological wastewater treatment. To achieve a high quality standard of effluent water, chemical treatment is generally preformed. However, this increases the cost and complicates the follow-up treatment.

Contaminated by the discharge of wastewater, the quality of raw water for drinking water often cannot meet the standards for drinking water. The main contaminating compound is ammonium nitrogen. In order to achieve the standard of raw water for drinking water, advanced treatment usually be conducted to treat the contaminated raw water. This increases the costs and wastes the resources.

SUMMARY OF THE INVENTION

The object of the present invention is to solve the above-mentioned problems and to provide a process for purifying refractory wastewater or raw water and a floated biological treatment apparatus for purifying refractory wastewater or raw water. By means of the process and apparatus of the present invention, the treatment cost for refractory organic material is reduced, treatment efficiency is enhanced, and effluent quality is improved. Moreover the hydraulic retention time required can be shortened, the treatment can be performed effectively.

To achieve the above objects, refractory wastewater or raw water is purified by treatment in a floated biological treatment apparatus. The refractory wastewater and raw water contain less than 200 mg/l of suspended solid (SS) and have a chemical oxygen demand (COD) less than 1000 mg/l and ammonium-nitrogen ($NH_3$-N) less than 200 mg/l. The floated biological treatment apparatus includes a reactor filled with porous compressible carriers in an amount of 80 vol % to 100 vol % of the reactor volume. The carriers are adhered with microorganisms and are in a floated state.

The present invention also provides a floated biological treatment apparatus for purifying refractory wastewater or raw water. The treatment apparatus includes a supporting plate for dividing the treatment apparatus into an upper and lower portions; a liquid inlet provided at the lower portion of the treatment apparatus, from which refractory wastewater or raw water can be introduced into the apparatus; and a gas inlet provided at the lower portion of the treatment apparatus, from which gas can be introduced into the apparatus. The upper portion is the reactor that is capable of loading the porous compressible carriers in an amount of 80 vol % to 100 vol % of the reactor volume. The supporting plate is provided with a plurality of holes having a diameter less than the diameter of the carriers, such that the carriers can be regained in the upper portion of the reactor by the supporting plate without falling into the lower portion of the reactor. The upper portion of the reactor is provided with at least one top carrier blocking plate. The top carrier blocking plate has a plurality of holes with a diameter less than the diameter of the carriers, such that the carriers can be limited by the top carrier blocking plate to be retained in the reactor, and the carrier can become a floating state.

BRIEF DESCRIPTION OF THE DRAWINGS

The present invention will become more fully understood from the detailed description given herein and the accompanying drawings, given by way of illustration only and thus not intended to be limitative of the present invention.

DETAILED DESCRIPTION OF THE INVENTION

Figure 1:
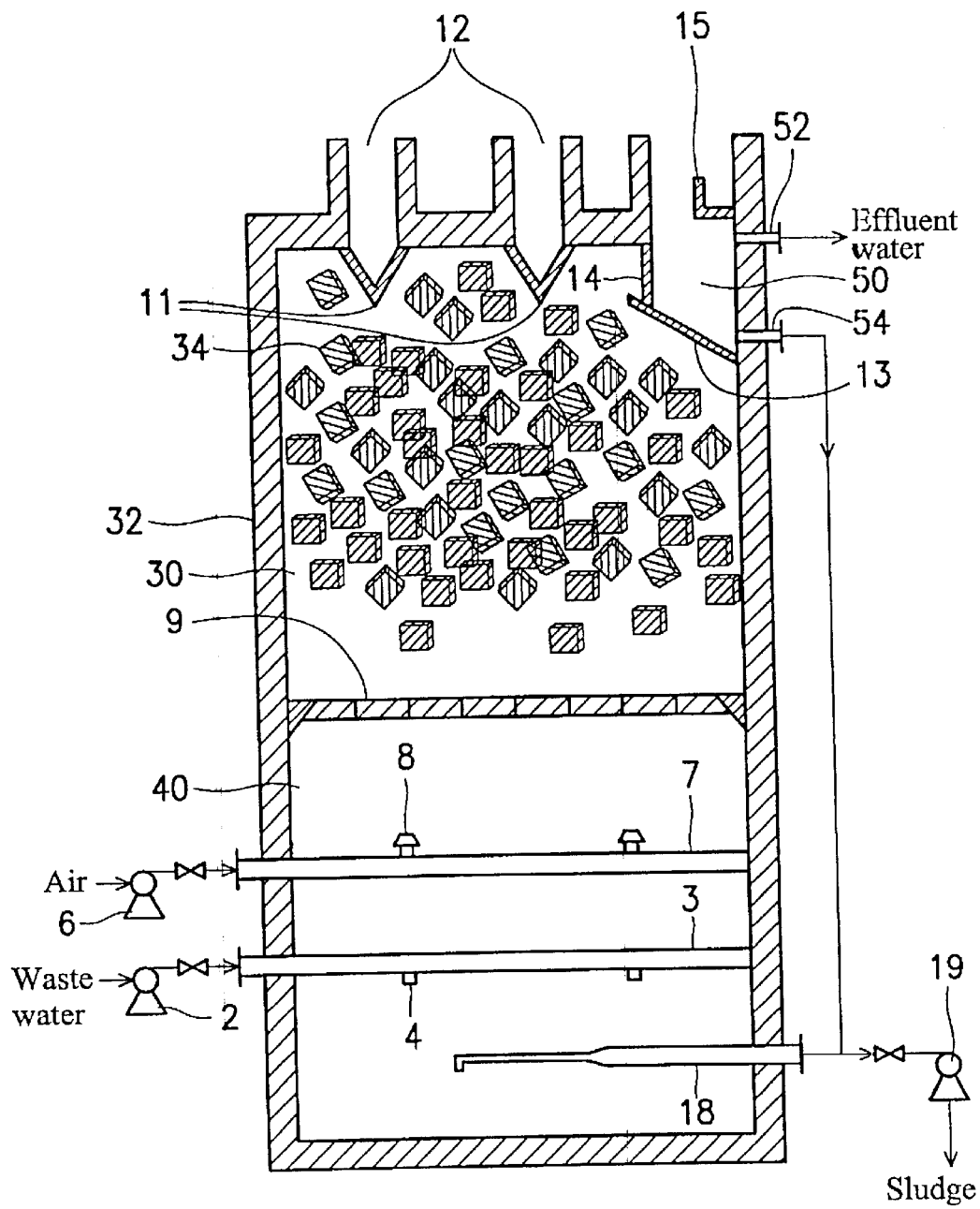
FIG. 1 shows a schematic cross-sectional view illustrating a floated biological treatment apparatus according to a preferred embodiment of the present invention.

Refer to FIG. 1, showing a schematic cross-sectional view illustrating a floated biological treatment apparatus according to a preferred embodiment of the present invention. The apparatus includes a supporting plate 9 for dividing the treatment apparatus into an upper portion 30 and a lower portion 40. The upper portion 30 constitutes a reactor 32. A liquid inlet 3 and a gas inlet 7 are provided at the lower portion 40. Refractory wastewater or raw water can be introduced into the apparatus via the liquid inlet 3.

The reactor 32 is capable of loading porous compressible carriers 34 in an amount of 80 vol % to 100 vol % of the reactor volume.

The liquid inlet 3 is connected to a feeding pump 2 at one end and is provided with nozzles 4. The gas inlet 7 is connected to a blower 6 and provided with a gas dispenser 8.

The supporting plate 9 is provided with a plurality of holes. The holes have a diameter less than the diameter of the carriers 34, such that the carriers 34 can be retained in the upper portion 30 of the reactor 32 by the supporting plate 9 without falling into the lower portion 40 of the reactor 32.

The upper portion 30 of the reactor 32 is provided with at least one top carrier blocking plate 11. The top carrier blocking plate 11 has a plurality of holes. The hole has a diameter less than the diameter of the carriers 34, such that the carriers 34 can be limited by the top carrier blocking plate 11 to be retained in the reactor 32, and the carriers 34 can become a floating state.

The shape of the top carrier blocking plate 11 is not limited. It is preferably in a tapered shape, and the tapered tip is downward as shown in FIG. 1. The taper-shaped blocking plate 11 and the horizontal plane are preferably at an angle of 30 to 75 degrees. In addition, the area of the taper-shaped blocking plate 11 is preferably ⅕ to ⅓ of the area of the upper portion 30 of the reactor 32.

The so-called refractory wastewater and raw water in the present invention contain less than 200 mg/l of SS and have a COD less than 1000 mg/l and a $NH_3$-N less than 200 mg/l. Such refractory wastewater can be secondary effluent or raw water.

The carrier suitable for use in the present invention can be a polymer and preferably a foamed polymer. The porosity of the carrier is preferably in the range of 30% to 100%. The density of the carrier is preferably 20 kg/m$^3$ to 60 kg/m$^3$. The shape of the carrier is not limited. For example, the carrier can be a cube having a length of 2.5 to 5 centimeters.

The treatment apparatus can be made of any suitable material with adequate strength, for example, cast iron, stainless steel, and pre-cast concrete.

To achieve better purifying effect, the floated biological treatment apparatus of the present invention can additionally include a gas directing plate 13, a side carrier blocking plate 14, and an upper effluent device.

The gas directing plate 13 is provided on a side wall of the reactor 32 and inclines downwardly toward the side wall. The side carrier blocking plate 14 is connected to the gas directing plate 13 to constitute an effluent area 50. The upper effluent device is provided in the effluent area 50 and it includes, from the top to the bottom, an effluent tube 52 for discharging purified water, and an upper sludge discharging tube 54 for discharging sludge.

The side carrier blocking plate 14 has a plurality of holes with a diameter less than the diameter of the carrier 34. Thus, the carriers 34 can be prevented from entering into the effluent area 50, while sludge and purified water can enter into the effluent area 50.

The inclined gas directing plate 13 can prevent gas from directly flowing into the effluent area 50. In addition, the inclined gas directing plate 13 can also direct sludge into the upper sludge discharging tube 54, and direct purified water into the effluent tube 52. The gas directing plate 13 and a horizontal plane are preferably at an angle of 45 to 75 degrees.

In addition, an overflow weir 15 can be additionally provided in the effluent area 50 and above the effluent tube 52. This uniformly distributes effluent and prevents the effluent from overflowing from the reactor. In the lower portion 40 of the treatment apparatus, a bottom sludge discharging tube 18 can be additionally provided for discharging sludge at the bottom.

The process for purifying refractory wastewater or raw water using the floated biological treatment apparatus of the present invention is described below.

Refractory wastewater or raw water is evenly introduced into the lower portion 40 of the treatment apparatus via the liquid inlet 3 using the feeding pump 2 and then evenly distributed into the lower portion 40 by the nozzle 4. Air is pumped into the gas inlet 7 by the blower 6 and then evenly distributed into the lower portion 40 by the gas dispenser 8.

As described above, the hole of the supporting plate 9 has a diameter less than the diameter of the carrier 34. Therefore, the supporting plate 9 can support the carrier 34 to retain the carrier 34 in the upper portion 30 without falling to the lower portion 40. Thus, the normal operation of the influent of water in the lower portion 40 is not affected.

Since the carriers 34 are compressible, it can be compressed and retained in the reactor 30 by the top carrier blocking plate 11. The loading ratio of the carrier in the reactor can be high, 80 vol % to 100 vol % of the reactor volume. Also, the carriers 34 becomes a floating state and does not flow. In addition, since the hole of the top carrier blocking plate 11 has a diameter less than the diameter of the carriers 34, the carriers 34 will not be vented from the reactor by compression. However, gas can be vented from the reactor via the gas outlet 12 through the outer and inner pores of the carriers.

The inclined gas directing plate 13 can be used to block gas directly flowing into the effluent area 50 and can be used to direct the sludge into the upper sludge discharging tube 54. The purified water is introduced into the effluent tube 52.

Since the hole of the side carrier blocking plate 11 has a diameter less than the diameter of the carrier 34, the carrier 34 can be prevented from directing into the effluent area 50 with water flowing and then flowing out of the reactor. In contrast, the sludge and purified water flow through the holes of the side carrier blocking plate 14, and then flow into the effluent area 50, and then out of the reactor. The overflow weir 15 provided above the effluent tube 52 can be used to distribute effluent water, thus preventing effluent water from overflowing from the reactor.

After the porous carriers 34 are full of microorganisms, it must be subjected to back washing. Suspended solids and sludge generated from back washing are then collected by the upper sludge discharging tube 54. The expelled sludge then leaves the system for further treatment.

The following examples are intended to illustrate the process and the advantages of the present invention more fully without limiting its scope, since numerous modifications and variations will be apparent to those skilled in the art.

EXAMPLE 1

The wastewater to be treated in this example was the wastewater from a petrochemical plant that has been subjected to a secondary biological treatment. The secondary effluent was purified by the treatment apparatus of the present invention for 20 weeks. The influent had a COD concentration varying in the range of 133 mg/l to 264 mg/l. The test results are shown in Table 1. The effluent (the treated water) has a COD concentration in the range of 83 mg/l to 146 mg/l. Volumetric loading of COD varies in the range of 0.42 kgCOD/m$^3$-day to 1.07 kg COD/m$^3$-day. COD removing amount can achieve as high as 31 mg/L to 118 mg/L. The results show that the residual refractory organic material in the secondary effluent can be effectively removed by the apparatus of the present invention. This greatly reduces the cost for the follow-up tertiary treatment.

TABLE 1

The treatment efficiency for refractory organic material by means of the present invention

| Week | COD of influent (mg/l) | COD of effluent (mg/l) | Volumetric loading of COD (kg COD/m$^3$-day) | COD removing amount of refractory organic material (mg/l) |
|---|---|---|---|---|
| Week 1 | 171 | 96 | 0.47 | 75 |
| Week 2 | 161 | 112 | 0.44 | 49 |
| Week 3 | 186 | 110 | 0.51 | 77 |
| Week 4 | 153 | 82 | 0.42 | 71 |
| Week 5 | 178 | 110 | 0.49 | 68 |
| Week 6 | 198 | 121 | 0.54 | 76 |
| Week 7 | 264 | 146 | 0.72 | 118 |
| Week 8 | 230 | 141 | 0.63 | 88 |
| Week 9 | 191 | 86 | 0.52 | 105 |
| Week 10 | 170 | 83 | 0.47 | 87 |
| Week 11 | 190 | 100 | 0.52 | 90 |
| Week 12 | 221 | 135 | 0.98 | 86 |
| Week 13 | 133 | 101 | 0.78 | 32 |
| Week 14 | 138 | 104 | 0.81 | 34 |
| Week 15 | 162 | 130 | 0.94 | 31 |
| Week 16 | 156 | 115 | 0.91 | 41 |

TABLE 1-continued

The treatment efficiency for refractory organic material by means of the present invention

| Week | COD of influent (mg/l) | COD of effluent (mg/l) | Volumetric loading of COD (kg COD/m³-day) | COD removing amount of refractory organic material (mg/l) |
|---|---|---|---|---|
| Week 17 | 156 | 101 | 0.91 | 55 |
| Week 18 | 144 | 110 | 0.84 | 34 |
| Week 19 | 184 | 129 | 1.07 | 55 |
| Week 20 | 199 | 143 | 0.95 | 55 |

EXAMPLE 2

The influent to be treated in this example was contaminated raw water for drinking water. Raw water was purified by the treatment apparatus of the present invention for 17 weeks. The influent had a $NH_3$-N concentration varying in the range of 4.3 mg/l to 8.6 mg/l. The test results are shown in Table 1. All of the effluent (the treated water) has a $NH_3$-N concentration lower than 1 mg/l, and most of the effluent has a $NH_3$-N concentration lower than 0.1 mg/l (the detection limit of the testing method). The $NH_3$-N removing ratio achieves 100%. The results show that $NH_3$-N material in raw water can be effectively removed by the apparatus of the present invention. This greatly reduces the cost for the follow-up advanced treatment.

TABLE 2

The treatment efficiency for $NH_3$-N material in raw water by means of the present invention

| Week | $NH_3$-N conc. of influent (mg/l) | $NH_3$-N conc. of effluent (mg/l) | Hydraulic etention time in reactor (mins) | $NH_3$-N removing ratio (%) |
|---|---|---|---|---|
| Week 1 | 4.4 | <0.1 | 20 | 100 |
| Week 2 | 4.3 | <0.1 | 20 | 100 |
| Week 3 | 5.1 | <0.1 | 20 | 100 |
| Week 4 | 5.3 | <0.1 | 20 | 100 |
| Week 5 | 5.0 | <0.1 | 20 | 100 |
| Week 6 | 4.3 | <0.1 | 20 | 100 |
| Week 7 | 6.1 | <0.1 | 20 | 100 |
| Week 8 | 5.9 | <0.1 | 20 | 100 |
| Week 9 | 4.8 | <0.1 | 20 | 100 |
| Week 10 | 5.1 | <0.1 | 20 | 100 |
| Week 11 | 5.5 | <0.1 | 20 | 100 |
| Week 12 | 6.0 | <0.1 | 20 | 100 |
| Week 13 | 7.2 | <0.1 | 20 | 100 |
| Week 14 | 8.6 | <0.1 | 20 | 100 |
| Week 15 | 7.8 | <0.1 | 20 | 100 |
| Week 16 | 7.9 | <0.1 | 20 | 100 |
| Week 17 | 7.7 | <0.1 | 20 | 100 |

In conclusion, the advantages of the present invention over the conventional technique can be summarized below.

(1) The floated biological treatment apparatus of the present invention can be used for further removal of refractory organic material. This greatly reduces the cost for the follow-up tertiary treatment.

(2) The floated biological treatment apparatus of the present invention can be used to treat contaminated raw water. This reduces the loading of water treatment, which in turn reduces the cost for the follow-up advanced treatment.

(3) The floated biological treatment apparatus of the present invention is filled with porous compressible carriers, which can provide large surface areas for microorganisms to adhere to and form biofilms. This can increase the mean cell retention time of microorganisms and species diversity of microorganisms.

(4) The floated biological treatment apparatus of the present invention can be filled with the carriers in an amount of 80 vol % to 100 vol %. Moreover, the carriers can be floated in the reactor, and there is no turbulent stirring between carriers. Thus, the carriers have lower abrasion.

(5) Since the carriers are compressible, they can adjust the positions in the reactor corresponding to the flow conditions. Thus, the clogging problems can be prevented, and the gas and the influent can be evenly distributed, which in turn effectively reduces the invalid volume.

(6) The floated biological treatment apparatus of the present invention has a new type of influent feeding device. The influent flows through downward nozzles and evenly mixes with gas from gas dispenser, whereby influent of refractory wastewater or raw water can be evenly distributed in the floating bed.

(7) The floated biological treatment apparatus of the present invention has a new type device for separately expelling gas and liquid. Thus, water and gas can be separately expelled from the reactor in a flow directing manner. This makes the carrier in the upper portion more stable, resulting in more stable treatment.

(8) The taper-shaped carrier blocking plate provided in the reactor can stabilize the flowing and venting of gas. The upper sludge discharging tube together with the bottom sludge discharging tube can enhance the back washing efficiency and flexibility.

(9) The floated biological treatment apparatus of the present invention is easy to be operated. Therefore, it is suitable to be applied with the current biological treatment method to enhance the effluent quality.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for purifying refractory wastewater or raw water for drinking water, comprising:

treating refractory wastewater or raw water in a floated biological treatment apparatus, wherein the refractory wastewater and raw water contain less than 200 mg/l of SS and have a COD less than 1000 mg/l and have a NH3-N less than 200 mg/l, wherein the floated biological treatment apparatus is divided into upper and lower portions by a supporting plate, the upper portion formed into a reactor, the reactor filled with porous compressible polymer carriers in an amount of 80 vol % to 100 vol % of the reactor volume, the carrier adhered with microorganisms and in a floating state, wherein the carriers are retained in the reactor by the supporting plate without falling to the lower portion of the apparatus.

2. The process as claimed in claim 1, wherein the refractory wastewater is secondary effluent.

3. The process as claimed in claim 1, wherein the carrier is a foamed polymer.

4. The process as claimed in claim 3, wherein the carrier has a porosity of 30% to 100%.

5. The process as claimed in claim 4, wherein the carrier has a density of 20 kg/m$^3$ to 60 kg/m$^3$.

6. The process as claimed in claim 5, wherein the carrier is a cube having a length of 2.5 to 5 centimeter.

7. A floated biological treatment apparatus for purifying refractory wastewater or raw water, comprising:

a supporting plate for dividing the treatment apparatus into upper and lower portions, the upper portion formed into a reactor, the reactor including porous compressible polymer carriers in an amount of 80 vol % to 100 vol % of the reactor volume;

a liquid inlet provided at the lower portion of the treatment apparatus, from which refractory wastewater or raw water can be introduced into the apparatus; and a gas inlet provided at the lower portion of the treatment apparatus, from which gas can be introduced into the apparatus;

wherein the supporting plate is provided with a plurality of holes having a diameter less than the diameter of the carrier, such that the carrier can be retained in the reactor by the supporting plate without falling to the lower portion of the apparatus, wherein the reactor is provided with at least one top carrier blocking plate, the top carrier blocking plate having a plurality of holes with a diameter less than the diameter of the carrier, such that the carrier can be limited by the top carrier blocking plate to be retained in the reactor, and the carrier can become a floating state.

8. A floated biological treatment apparatus for purifying refractory wastewater or raw water, comprising:

a supporting plate for dividing the treatment apparatus into upper and lower portions, the upper portion formed into a reactor, the reactor including porous compressible polymer carriers in an amount of 80 vol % to 100 vol % of the reactor volume;

a liquid inlet provided at the lower portion of the treatment apparatus, from which refractory wastewater or raw water can be introduced into the apparatus; and a gas inlet provided at the lower portion of the treatment apparatus, from which gas can be introduced into the apparatus;

wherein the supporting plate is provided with a plurality of holes having a diameter less than the diameter of the carrier, such that the carrier can be retained in the reactor by the supporting plate without falling to the lower portion of the apparatus, wherein the reactor is provided with at least one top carrier blocking plate, the top carrier blocking plate having a plurality of holes with a diameter less than the diameter of the carrier, such that the carrier can be limited by the top carrier blocking plate to be retained in the reactor, and the carrier can become a floating state, wherein the top carrier blocking plate is in a tapered shape, and the tapered tip is downward.

9. The apparatus as claimed in claim 8, wherein the taper-shaped blocking plate and the horizontal plane are at an angle of 30 to 75 degrees.

10. The apparatus as claimed in claim 9, wherein the area of the taper-shaped blocking plate is $1/5$ to $1/3$ of the area of the upper portion of the reactor.

11. The apparatus as claimed in claim 8, further comprising:

a gas directing plate provided on a side wall of the reactor, inclining downwardly toward the side wall;

a side carrier blocking plate connected to the gas directing plate to constitute an effluent area; and an upper effluent device provided in the effluent area, wherein the upper effluent device includes, from the top to the bottom, an effluent tube for discharging purified water, and an upper sludge discharging tube for discharging sludge, wherein the side carrier blocking plate has a plurality of holes with a diameter less than the diameter of the carrier, such that the carrier can be prevented from entering into the effluent area and sludge and purified water can enter into the effluent area, wherein the inclined gas directing plate can prevent gas from directly flowing into the effluent area, direct sludge into the upper sludge discharging tube, and direct purified water into the effluent tube.

12. The apparatus as claimed in claim 11, wherein the gas directing plate and the horizontal plane are at an angle of 45 to 75 degrees.

13. The apparatus as claimed in claim 11, further comprising a bottom sludge discharging tube provided in the lower portion of the treatment apparatus for discharging sludge at the bottom.

* * * * *